United States Patent
Jiang et al.

(10) Patent No.: US 11,184,064 B2
(45) Date of Patent: Nov. 23, 2021

(54) TRANSMISSIONS USING ANTENNA PORT SETS

(71) Applicant: ZTE Corporation, Guangdong (CN)

(72) Inventors: Chuangxin Jiang, Guangdong (CN); Hao Wu, Guangdong (CN); Yu Ngok Li, Guangdong (CN); Zhaohua Lu, Guangdong (CN); Meng Mei, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/019,117

(22) Filed: Sep. 11, 2020

(65) Prior Publication Data

US 2020/0412421 A1 Dec. 31, 2020

Related U.S. Application Data

(63) Continuation of application No. PCT/CN2018/078878, filed on Mar. 13, 2018.

(51) Int. Cl.
*H04B 7/0456* (2017.01)
*H04W 72/04* (2009.01)

(52) U.S. Cl.
CPC ......... *H04B 7/0469* (2013.01); *H04B 7/0486* (2013.01); *H04W 72/048* (2013.01)

(58) Field of Classification Search
CPC .. H04B 7/0469; H04B 7/0486; H04W 72/048
See application file for complete search history.

(56) References Cited

U.S. PATENT DOCUMENTS

| 2018/0049047 | A1 | 2/2018 | Lin et al. | |
| 2020/0235901 | A1* | 7/2020 | Dou | H04B 7/024 |
| 2020/0382180 | A1* | 12/2020 | Wang | H04L 5/0053 |

(Continued)

FOREIGN PATENT DOCUMENTS

| CN | 101155012 A | 4/2008 |
| CN | 102412889 A | 4/2012 |
| CN | 103918195 A | 7/2014 |

(Continued)

OTHER PUBLICATIONS

International Search Report, PCT/CN2018/078878, dated Nov. 18, 2018, 6 pages.

(Continued)

*Primary Examiner* — Jaison Joseph
(74) *Attorney, Agent, or Firm* — Perkins Coie LLP

(57) ABSTRACT

Methods, systems, and devices related to reducing signaling overhead for coherent uplink transmissions using many antenna ports. In one representative aspect, a method for wireless communication is described. The method includes transmitting, from a mobile device that comprises eight antenna ports, a message to a wireless communication node, the message including at least a first field indicating a first capability of the mobile device for performing a one-layer transmission using two antenna ports corresponding to a first port set selected from two or more port sets, and a second field indicating a second capability of the mobile device for performing a one-layer transmission using four antenna ports corresponding a second port set selected from the two or more port sets.

20 Claims, 5 Drawing Sheets

(56) References Cited

U.S. PATENT DOCUMENTS

2021/0135922 A1* 5/2021 Gao .................... H04L 5/0023

FOREIGN PATENT DOCUMENTS

| | | |
|---|---|---|
| CN | 105122668 A | 12/2015 |
| CN | 106817156 A | 6/2017 |
| CN | 106899378 A | 6/2017 |
| CN | 107231691 A | 10/2017 |

OTHER PUBLICATIONS

Chinese Office Action for CN Appl. No. 201880090876.6, dated Aug. 16, 2021, 11 pages.

* cited by examiner

TRANSMISSIONS USING ANTENNA PORT SETS

CROSS REFERENCE TO RELATED APPLICATIONS

This patent document is a continuation of and claims benefit of priority to International Patent Application No. PCT/CN2018/078878, filed on Mar. 13, 2018. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to reducing signaling overhead for coherent uplink transmissions using many antenna ports.

In one representative aspect, a method for wireless communication is disclosed. The method includes transmitting, from a mobile device that comprises eight antenna ports, a message to a wireless communication node, the message including at least a first field indicating a first capability of the mobile device for performing a one-layer transmission using two antenna ports corresponding to a first port set selected from two or more port sets, and a second field indicating a second capability of the mobile device for performing a one-layer transmission using four antenna ports corresponding to a second port set selected from the two or more port sets. An individual port set of the two or more port sets includes one of: (a) two antenna ports, or (b) four antenna ports.

In another representative aspect, a method for wireless communication is disclosed. The method includes transmitting, from the wireless communication node to a mobile device that comprises eight antenna ports, a first message including a wideband information indicating one or more port sets for a transmission to be performed from the mobile device to the wireless communication node. An individual port set includes one of: (a) two antenna ports, or (b) four antenna ports. The wideband information allows the mobile device to identify a precoder for performing the transmission. The method also includes receiving, at the wireless communication node, the transmission from the mobile device using antenna ports corresponding to the one or more port sets indicated by the message.

In another representative aspect, a method for wireless communication is disclosed. The method includes receiving, at a mobile device that comprises eight antenna ports, a first message from a wireless communication node. The first message includes a wideband information indicating one or more port sets for a transmission to be performed from the mobile device to the wireless communication node. An individual port set includes one of: (a) two antenna ports, or (b) four antenna ports. The method further includes determining, based on the one or more port sets indicated by the first message, a precoder for performing the transmission. The method also includes performing, by the mobile device, the transmission to the wireless communication node using antenna ports corresponding to the one or more port sets indicated by the first message.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

In wireless communication systems, a wireless communication node, such as a base station, often allocates only a partial portion of the full system bandwidth for a specific User Equipment (UE) at a specific time. It is thus desirable for the base station to know which portion(s) across the overall bandwidth has a better channel quality compared to the remaining portion of the full system bandwidth. The UEs can transmit reference signals to the base station (e.g., eNodeB or gNodeB) and using these reference signals, the base station can obtain information on the channel quality of uplink path(s). The network can then allocate a specific frequency region that is the best for each of the UEs. For example, the Sounding Reference Signal (SRS) is a reference signal transmitted by a UE in the uplink direction. The SRS is used by the eNodeB to estimate the uplink channel quality over a bandwidth. The eNodeB may use this information for uplink frequency selective scheduling.

In the current wireless communication systems, two transmission schemes are supported for the Physical Uplink Shared Channel (PUSCH): codebook based transmission and non-codebook based transmission. For codebook based transmissions, the UE determines its PUSCH transmission precoder based on SRS Resource Indicator (SRI), Transmitted Rank Indication (TRI), and Transmitted Precoding Matrix Indicator (TPMI) fields in a Downlink Control Indicator (DCI) message.

For non-codebook based transmissions, the UE can determine its PUSCH precoder and transmission rank based on the wideband SRI field from the DCI. This is because, when channel reciprocity holds (i.e., both downlink and uplink transmission links match, such as in a time division duplexing, or TDD, channel), the channel estimation of the uplink direction at the transmitter can be used directly for link adaptation in the downlink direction. In such cases, UE can calculate uplink precoders based on information provided by the SRI field, such as the resources used for SRS transmissions, thus no codebook is required. For example, the base station can indicate, based on SRS transmissions, resources to be used for uplink transmission in the SRI field. The resources can be a subset or all of the SRS resources used for the SRS transmissions. The UE can use the same precoder for one or multiple resources as indicated by the DCI.

Figure 1:
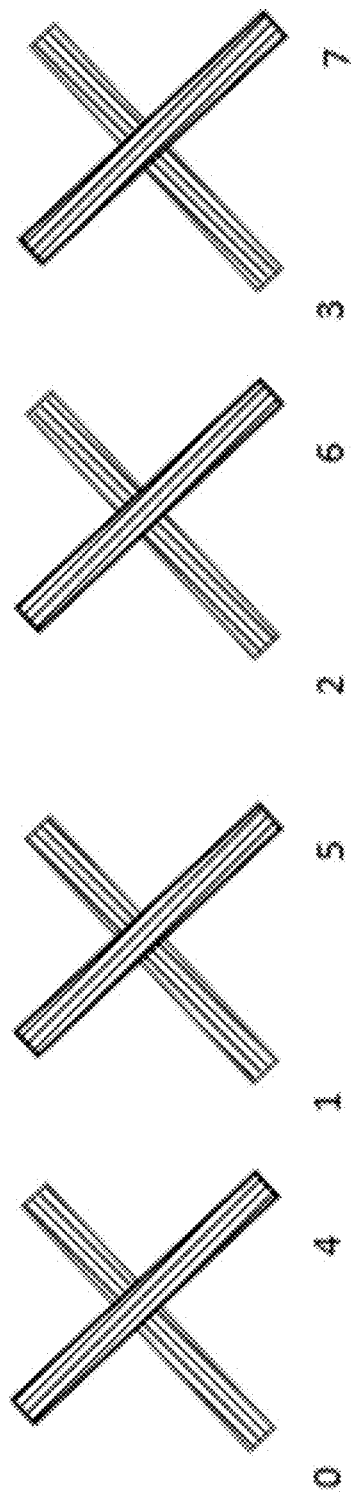
FIG. 1 is a schematic diagram of transmission pattern for eight antenna ports.

Currently, many UEs support up to four antenna ports for uplink codebook based transmissions. However, with the advances of wireless communication technology, UE can support more than four antenna ports (e.g., six, eight, or more antenna ports). FIG. 1 shows a schematic diagram of a transmission pattern for eight antenna ports. In this example, antenna ports {0, 4}, {1, 5}, {2, 6}, {3, 7} correspond to the first, second, third, and fourth pair of cross-polarization antennas respectively. One pair of cross-polarization antennas can be considered as one port pair.

For UEs with higher capability, uplink transmissions in rank-R ($1 \leq R \leq R_{max}$) can be performed using all available eight antenna ports. However, for UEs with lower capability, due to the difficulty in performing coherent uplink transmissions using all antenna ports, uplink transmissions in rank-R can be performed using only a subset of antenna ports. Typically, if one layer transmission is performed using more than one but not all available antenna ports, the transmission is called a partial coherent transmission. For example, when transmissions in rank-1 are performed using only two antenna ports by a UE that has eight antenna ports available, only two values of the rank-1 uplink precoder are non-zeros (i.e., only two antenna ports can be used for coherent transmissions). When one layer transmission is performed using only four antennas by a UE that has eight antenna ports available, only four values for one column of the uplink precoder are non-zeros (i.e., only four antenna ports can be used for coherent transmissions).

This patent disclosure describes various techniques that are suitable for uplink transmissions when the UE supports at least eight antenna ports. The disclosure also discusses techniques that can be used in various embodiments to reduce signaling overhead in downlink control messages (e.g., Downlink Control Indicator) for indicating which antenna port(s) to be used for the transmissions. In the discussions below, techniques are described for enabling a UE that supports eight antenna ports to perform partial coherent transmissions. It is noted that, however, the described techniques can also be applied to UEs that supports more than eight antenna ports.

There are two categories of partial coherent transmissions for a UE that supports transmissions using up to eight antenna ports:

(1) Category 1: two-antenna partial coherent transmissions. The eight antenna ports are grouped into four coherent port sets: port set 0 includes ports {0, 4}, port set 1 includes ports {1, 5}, port set 2 includes ports {2, 6}, and port set 3 includes ports {3, 7}. The cross-polarization antenna ports in each set allow coherent transmissions by the UE.

(2) Category 2: four-antenna partial coherent transmissions. The eight antenna ports are grouped into two coherent port sets: port set 0 includes ports {0, 1, 4, 5} and port set 1 includes ports {2, 3, 6, 7}. The two pairs of cross-polarization antenna ports in each set allow coherent transmissions by the UE.

The base station can indicate which port set(s) to be used for rank-R transmissions. To reduce signaling overhead, various techniques can be adopted by the base station and/or the UE to reduce the number of bits required in the downlink control messages.

In some embodiments, the base station can use a bitmap, with each bit corresponding to a port set, to restrict some port sets for one or more ranks. The bitmap can be signaled to the UE via higher layer signaling, such as Radio Resource Control (RRC) or Medium Access Control (MAC) Control Element (CE). A zero bit in the bitmap indicates that the corresponding port set is not a candidate for transmissions. For rank-R transmissions, the number of "1" bits in the bitmaps is equal to or larger than R. If the number of "1" bits is smaller than R in a bitmap for rank R, the bitmap indicates that rank-R transmission is not supported.

In some embodiments, the number of candidate port sets for rank-R transmission is N(R). N(R) can be predefined or signaled via higher layer signaling. For example, for rank-2 transmissions, N(2)=1 or 2 candidate port sets can be configured. Similarly, in some embodiments, N(2)=2, N(3)=4, and/or N(4)=4. Different ranks can have the same number of candidate port sets. For example, N(1)=N(2)=1, and N(3)=N(4)=3.

In some embodiments, candidate port sets for rank R+1 must include all candidate port sets for rank R. For example, the candidate port set for rank-1 transmissions is port set 2. Then candidate port sets for rank-2 transmissions can be port sets 2 and 3. Candidate port sets for rank-3 transmission can be port sets 2, 3, and 0.

In some embodiments, when the number of candidate port sets is equal to or larger than R, the base station and the UE can adopt a predefined rule such that transmissions in each layer use a different port set selected from the candidate port sets.

In some embodiments, candidate port set(s) can be predefined for a number of ranks. For example, Table 1 shows representative candidate ports for ranks 1-4. For each rank R, R number of port set candidate(s) are configured. Table 1 can be predefined or signaled to the UE via higher layer signaling. After the UE obtains the table, the base station only needs four bits for the index values to indicate which port set(s) to be used for a particular rank R. In some implementations, after indicating the table, the base station can further restrict some of the entries in the table. For example, the base station can use a bitmap to allow only indices {2, 3, 6, 7, 8, 9, 13}. The bitmap can be transmitted to the UE via higher layer signaling. Then, in the downlink control messages, the base station only needs three bits to indicate which candidate port set(s) to be used. For rank R transmissions, a port set group can be configured (e.g., activated or restricted) via higher layer signaling. For example, each port set group can include one or more port set corresponding candidate port set(s) as shown in of the rows of Table 1 or 2.

TABLE 1

Representative Candidate Port Sets for category 1

| index | Rank R | Candidate Port Set(s) |
|---|---|---|
| 0 | 1 | 0 |
| 1 | | 1 |
| 2 | | 2 |
| 3 | | 3 |
| 4 | 2 | 0, 1 |
| 5 | | 0, 2 |
| 6 | | 0, 3 |
| 7 | | 1, 2 |
| 8 | | 1, 3 |
| 9 | | 2, 3 |
| 10 | 3 | 0, 1, 2 |
| 11 | | 0, 1, 3 |
| 12 | | 0, 2, 3 |
| 13 | | 1, 2, 3 |
| 14 | 4 | 0, 1, 2, 3 |

Table 2 shows another set of representative candidate port sets for multiple ranks. In this example, for each rank R, R or less than R candidate port set(s) can be used. For example, rank-3 transmissions can use two port sets, and rank-4 transmissions can use two or three port sets.

TABLE 2

Alternative Candidate Port Sets for category 1

| index | Rank R | Candidate Port Sets |
|---|---|---|
| 0 | 1 | 0 |
| 1 | | 1 |
| 2 | | 2 |
| 3 | | 3 |
| 4 | 2 | 0, 1 |
| 5 | | 0, 2 |
| 6 | | 0, 3 |
| 7 | | 1, 2 |
| 8 | | 1, 3 |
| 9 | | 2, 3 |
| 10 | 3 (the first | 0, 1 |
| 11 | port set has | 0, 2 |
| 12 | two layers) | 0, 3 |
| 13 | | 1, 2 |
| 14 | | 1, 3 |
| 15 | | 2, 3 |
| 16 | 3 (the first | 1, 0 |
| 17 | port set has | 2, 0 |
| 18 | two layers) | 3, 0 |
| 19 | | 2, 1 |
| 20 | | 3, 1 |
| 21 | | 3, 2 |
| 22 | 3 (one port | 0, 1, 2 |
| 23 | set | 0, 1, 3 |
| 24 | correspond | 0, 2, 3 |
| 25 | to one layer) | 1, 2, 3 |
| ... | ... | ... |
| Last Index | Greatest Rank | Last combination |

The number of candidate port sets shown in Table 2 is quite large, which may not be desirable considering the amount of signaling required to indicate which port set(s) to be used for a rank. To reduce the amount of possibilities for candidate port sets, the base station and the UE can agree upon a set of predefined rules, such as rank-2 transmissions can use only one port set, rank 2, 3, 4 transmissions can use only two port sets, or rank 3, 4 transmissions can use only three port sets, etc. Table 3 shows another set of representative candidate port sets that is determined based on one or more predetermined rules.

TABLE 3

Alternative Candidate Port Sets for category 1

| index | Rank R | Port sets within port set group |
|---|---|---|
| 0 | 1 or 2 | 0 |
| 1 | | 1 |
| 2 | | 2 |
| 3 | | 3 |
| 4 | 2 or 3 or 4 | 0, 1 |
| 5 | | 0, 2 |
| 6 | | 0, 3 |
| 7 | | 1, 2 |
| 8 | | 1, 3 |
| 9 | | 2, 3 |
| 10 | 3 or 4 | 0, 1, 2 |
| 11 | | 0, 1, 3 |
| 12 | | 0, 2, 3 |
| 13 | | 1, 2, 3 |
| 14 | 4 | 0, 1, 2, 3 |

As indicated by the above discussion, the candidate port set(s) or the candidate port set group(s) for rank R transmission can be configured by higher layer signaling or be known a priori to the base station and/or the UE.

In some embodiments, higher layer signaling (e.g., RRC and/or MAC CE) is particularly suitable for periodic or semi-persistent scheduling to reduce signaling overhead in downlink control messages. The base station can accumulate long-term uplink channel information and restrict port set(s) with low signal to interference and noise ratio (SINR). For aperiodic transmissions, the following set of criteria can help the base station and/or the UE to determine which codebook is suitable for uplink transmissions:

1. For transmission on Physical Uplink Shared Channel (PUSCH) based on aperiodic scheduling, rank R transmissions ($1 \leq R \leq 4$) use R number of port sets.

2. For transmission on PUSCH based on periodic scheduling, rank R transmissions ($2 \leq R \leq 4$) can use less than R number of port sets.

For example, one or two port sets can be indicated using downlink control messages for rank-2 transmission. In some embodiments, two or three port sets can be indicated using downlink control messages for rank-3 transmissions. In some embodiments, two, three, or four port sets can be indicated using downlink control messages for rank-4 transmissions. In some implementations, three or four port sets can be indicated using downlink control messages for rank-4 transmissions. In some implementations, two or three or four port sets can be indicated using downlink control messages for rank-4 transmissions.

In some embodiments, the number of port sets for rank R transmission can be configured by higher layer signaling or be known a priori to the base station and/or the UE to reduce signaling overhead. The base station then can signal the specific port set(s) or port set group(s) in the downlink control messages. Without any limitations on the number of candidate port set(s) or candidate port set group(s), uplink transmissions can be performed using a variable number of port set(s). For example, rank 2 transmissions can use either one or two port sets because each port set can be used to transmit two layers. Similarly, rank 3 transmissions may use either two or three port sets, and rank 4 transmissions may use two, three, or four port sets. To reduce signaling overhead for indicating one or more port sets for the uplink data transmission, the number of port sets for rank R transmissions can be configured via higher layer signaling or can be known a priori to the base station and/or the UE.

For example, the base station can semi-statically configure the number of port sets for rank 2 transmissions to be 2 and informs the UE via a higher layer signaling message. Alternatively, the UE can recommend and/or report the number of port sets for rank 2 transmissions to the base station when the information is known a priori to the UE. Subsequent rank 2 transmissions thus use two port sets instead of one or two port sets. Referring back to Table 3, after the number of port sets for rank 2 transmissions is limited to 2, index values 0, 1, 2, 3 can no longer be used for rank 2 transmissions. With fewer options to signal (e.g., index values 0-9 versus index values 4-9), signaling overhead can be reduced.

As another example, the base station can semi-statically configure the number of port sets for rank 4 transmissions using a set: {3, 4}. This means that rank 4 transmission can be performed using either 3 port sets or 4 port sets. Alternatively, the UE can report the number of port sets for rank 2 transmissions to the base station when the information is known a priori to the UE. For rank 3 transmissions, representative sets include {2}, {3}, or {2, 3}, indicating that rank 3 transmissions can be performed using 2 port sets, 3 port sets, or either 2 or 3 port sets. Similarly, for rank 2 transmissions, representative sets include {1}, {2}, or {1, 2}. If {1, 2} is configured, then subsequent rank 2 transmissions can use either 1 or 2 port sets. If {1} is configured, subsequent rank 2 transmissions can only use 1 port set. If {2} is configured, subsequent rank 2 transmissions can use 2 port sets.

In some embodiments, the maximum or minimum number of port sets can be configured via higher-layer signaling or be known a priori to the base station and/or the UE. For example, the base station can semi-statically configure the maximum number of port sets for rank 3 transmissions to be two. Alternatively, the UE can report the maximum number of port sets for rank 3 transmission to the base station when the information is known a priori to the UE. Subsequent rank 3 transmissions thus use two port sets instead of two or three port sets. Referring back to Table 2, after the maximum number of port sets for rank 3 transmission is limited to 2, index values 22-25 are no longer valid options to configure rank 3 transmissions. With fewer options to signal (e.g., index values 10-25 versus index values 10-21), signaling overhead can be reduced. As another example, the base station can semi-statically configure the minimum number of port sets for rank 3 transmission to be 3. Alternatively, the base station can report the minimum number of port sets for rank 3 transmission to the base station when the information is known a priori to the UE. Subsequent rank 3 transmission thus use three port sets instead of two or three port sets. Referring back to Table 2 again, after the minimum number of port sets for rank 3 is limited to 3, index values 10-21 are no longer valid options to configure rank 3 transmissions. With fewer options to signal (e.g., index values 10-25 versus index values 22-25), signaling overhead can be reduced.

In some embodiments, the UE can recommend the suitable values for the number of port sets, the maximum number of port sets, and/or the minimum number of ports for rank R transmission to the base station. The UE can report the recommended values to the base station to assist the base station to decide the final value(s) to use. When the UE supports maximum 8 layers, R can be one of {1, 2, 3, 4, 5, 6, 7, 8}. When the UE supports maximum 4 layers, R can be one of {1, 2, 3, 4} for UE can support maximum 4 layers.

Details of the disclosed techniques are described in the following embodiments. In the following embodiments, a wideband channel may, for example, include 128, 512, 1024 or higher number of subcarriers and may span a bandwidth of several MHz (e.g., 1, 5, 10, 20 or greater than 20 MHz).

Example Embodiment 1

This embodiment describes how UE can report its partial coherent transmission capabilities to a wireless communication node (e.g., a base station).

The UE can inform the base station its partial coherent transmission capabilities (e.g., whether it can support two-antenna coherent transmissions and/or four-antenna coherent transmissions) for one layer transmission. In some implementations, the UE can support both two-antenna coherent transmissions (Category 1) and four-antenna coherent transmissions (Category 2), and it reports its capabilities for both categories. It is noted that for rank-1 transmissions, only two-antenna partial coherent uplink transmissions are allowed even when the UE supports four-antenna partial coherent uplink transmissions.

For example, the UE reports two types of capabilities regarding uplink partial coherent transmissions: (1) its capabilities for two-antenna partial coherent uplink transmissions, and (2) its capabilities for four-antenna partial coherent uplink transmissions.

In some embodiments, the UE can support all the port sets in each category. For example, if UE supports Category 1, then UE supports all four port sets {0, 4}, {1, 5}, {2, 6}, and {3, 7}. In some embodiments, the UE can indicate to the base station which port set(s) can be used for each category. For example, the UE may indicate that, for Category 1, only three port sets {0, 4}, {1, 5}, and {2, 6} are supported.

Figures 2A, 2B:
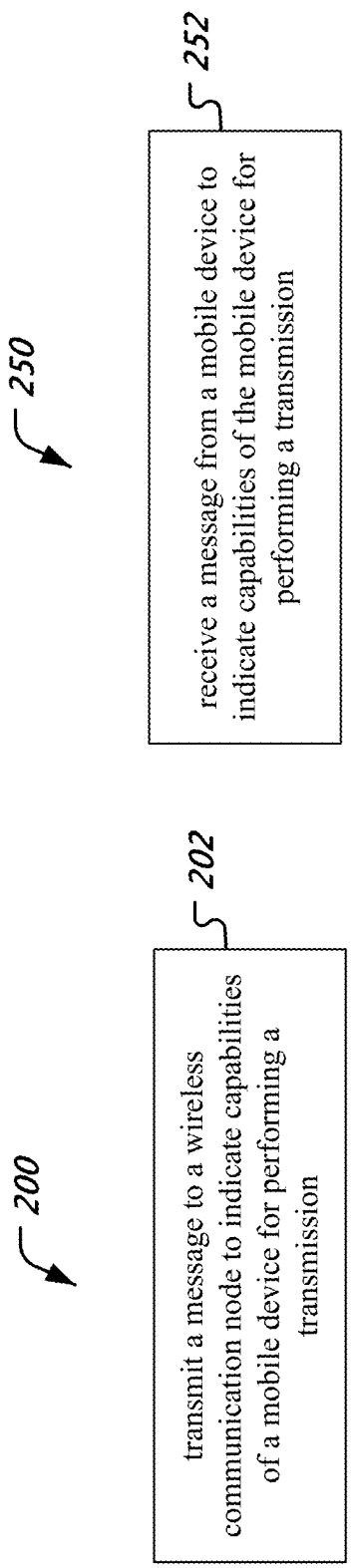
FIG. 2A is a flowchart representation of a method for wireless communication.
FIG. 2B is a flowchart representation of another method for wireless communication.

FIG. 2A is a flowchart representation of a method 200 for wireless communication. The method 200 includes, at 202, transmitting, from a mobile device that comprises eight antenna ports, a message to a wireless communication node. The message includes at least a first field indicating a first capability of the mobile device for performing a one-layer transmission using two antenna ports corresponding to a first port set selected from two or more port sets, and a second field indicating a second capability of the mobile device for performing a one-layer transmission using four antenna ports corresponding to a second port set selected from the two or more port sets. An individual port set of the two or more port sets includes one of: (a) two antenna ports, or (b) four antenna ports. It is noted that a one-layer transmission is also referred to as a single-layer transmission.

FIG. 2B is a flowchart representation of a method 250 for wireless communication.

The method 250 includes, at 252, receiving, at a wireless communication node, a message from a mobile device that comprises eight antenna ports, the message including at least a first field indicating a first capability of the mobile device for performing a transmission using two antenna ports corresponding to a first port set selected from two or more port sets, and a second field indicating a second capability of the mobile device for performing a transmission using four antenna ports corresponding to a second port set selected from the two or more port sets. An individual port set of the one or more port sets includes one of: (a) two antenna ports, or (b) four antenna ports.

Category 1: Two-Antenna Partial Coherent Transmissions

After obtaining UE's capabilities regarding partial coherent transmissions, the base station can indicate which port set(s) to be used for uplink transmissions. Such indication can be made in one or more downlink control messages, such as Downlink Control Indication (DCI) messages.

In addition to the port set selection, a co-phasing value $i_2$ indicating a phase difference between the two ports in the port set that have different polarizations can be indicated to the UE. The co-phasing value can be a wideband indication, or an indication for a sub-band. For example, $i_2$ corresponds to an index value for the co-phasing value between port 0 and port 4.

The quantities $p_{i_1}$ ($i_1$=0,1,2,3) and $\varphi_n$ for Category 1 are given as:

$p_0=[1\ 0\ 0\ 0]^T, p_1=[0\ 1\ 0\ 0]^T, p_2=[0\ 0\ 1\ 0]^T, p_3=[0\ 0\ 0\ 1]^T$
$\varphi_n = e^{j\pi n/2}$ Example Embodiment 2

This embodiment describes how the base station can indicate the port set to be used for rank-1 transmissions in the case of two-antenna partial coherent transmissions.

Rank-1 transmissions cannot be performed using more than one port set. Therefore, based on the capabilities reported by the UE, the base station can choose one from the four port sets (or reported port sets by the UE).

For example, $i_1$ indicates the port set selection. That is, $i_1$=0, 1, 2, 3 represents port set 0, 1, 2, 3 respectively. The port set selection is for the entire bandwidth part (BWP) or component carrier (CC), and thus is a wideband indication that can be included in an uplink grant.

The corresponding precoder W for rank-1 transmission is shown in Table 4, wherein t and n correspond to $i_1$ and $i_2$ respectively and M=8.

TABLE 4

Representative Uplink Rank-1 Codebook for Eight Antenna Ports

| $i_1$ | $i_2$ | |
|---|---|---|
| 0, 1, 2, 3 | 0, 1, 2, 3 | $W_{i_1,i_2}$ |

$$W_{t,n} = \frac{1}{\sqrt{M}} \begin{bmatrix} p_t \\ \varphi_n p_t \end{bmatrix}$$

The UE can decide the codebook to be used based on at least four bits in the DCI message, with two bits for $i_1$ and two bits for $i_2$. For example, when the DCI includes wideband information only, four bits are needed for indicating $i_1$ and $i_2$. In some embodiments, the DCI message includes sub-band information (e.g., an $i_2$ value for each sub-band). Thus, more bits are needed for indicating both the port set selection and the co-phasing values.

Example Embodiment 3

This embodiment describes how the base station can indicate the port set to be used for rank-2 transmissions in the case of two-antenna partial coherent transmissions.

Case 1: One Port Set

For rank-2 transmissions, in some cases, both layers can be transmitted by one port set because one port set can support two layers. For example, $i_1$ indicates the port set selection. The port set selection may be for the entire bandwidth part (BWP) or component carrier (CC), and thus is a wideband indication that can be included in an uplink grant.

In addition to the port set selection, a co-phasing value $i_2$ indicating the phase difference between the two ports can be indicated to the UE in the DCI message. To reduce signaling overhead, $i_2$ can have only two values: 0 or 1. Limiting the value of $i_2$ may be useful when the channel condition of one port set is much better than others. However, the transmit power can be reduced by half because power sharing may not be done between two non-coherent port sets. The corresponding precoder W is shown in Table 5, wherein t and n correspond to $i_1$ and $i_2$ respectively and M=8.

TABLE 5

Representative Uplink Rank-2 codebook for Eight Antenna Ports

| $i_1$ | $i_2$ | |
|---|---|---|
| 0, 1, 2, 3 | 0, 1 | $W_{i_1,i_2}$ |

$$W_{t,n} = \frac{1}{\sqrt{2M}} \begin{bmatrix} p_t & p_t \\ \varphi_n p_t & -\varphi_n p_t \end{bmatrix}$$

Case 2: Two Port Sets

In some cases, transmission in the two layers are performed using two separate port sets. Value $i_1$ can be used to indicate port set selection. To allow flexibility in port set selections, $i_1$ can be used to indicate any two port sets from the four port sets. The total number of possibilities is $C_4^2$=6, thus the value of $i_1$ is in the range of [0, 5], with each value indicating a port set pair (t1, t2)=(0,1), (0,2), (0,3), (1,2), (1,3), or (2,3).

The co-phasing values in these cases are different than the values shown in Table 2 because transmissions using two separate port sets are non-coherent. To allow greater flexibility, $i_2$ can have two parts: $i_{21}$ for the co-phasing value for layer 1, and $i_{22}$ for the co-phasing value for layer 2. Because two port sets transmit signal independently, the transmit power doubles the transmit power in the Case 1 mentioned above.

The corresponding precoder W is shown in Table 6, wherein $t_1$ and $t_2$ correspond $i_1$ for each rank, n correspond to $i_{21}$, m corresponds to $i_{22}$, and M=8.

TABLE 6

Alternative Uplink Rank-2 codebook for Eight Antenna Ports

| $i_1$ | $i_{21}$ | $i_{22}$ | |
|---|---|---|---|
| 0-5 | 0-3 | 0-3 | $W_{i_1,i_{21},i_{22}}$ |

$$W_{t_1,t_2,n,m} = \frac{1}{\sqrt{M}} \begin{bmatrix} p_{t_1} & p_{t_2} \\ \varphi_n p_{t_1} & \varphi_m p_{t_2} \end{bmatrix}$$

Case Three: One or Two Port Set(s)

Transmissions in the two layers can be performed using either one port set or two port sets. In such cases, values of $i_1$ are in a larger range [0, 9]. The range [0, 3] is used for the one port set cases, and the range [4, 9] is used for the two port sets cases. The values of $i_2$ also change according to $i_1$.

To reduce signaling overhead, the base station can define one or more predetermined rules to limit the number of port set selections. For example, the base station and the UE can agree that only two consecutive port sets (e.g., port set 0 and 1, 1 and 2, 2 and 3, 3 and 1) can be used for rank-2 transmissions.

To reduce signaling overhead and still maintain flexibility in signaling the port set selection and/or co-phasing values, certain values of $i_1$ can be restricted via higher layer signaling. The number of port sets (or, alternatively, the maximum and/or minimum number of port sets) for a particular rank R can be configured via higher layer signaling. For example, the number of port sets for rank 2 is predetermined to be 2. The range of valid values for $i_1$ thus changes from [0, 5] to [0, 3] accordingly. In some embodiments, the base station can signal a subset of the port sets as candidate port sets via higher layer signaling (e.g., RRC or MAC CE) to the UE. In some embodiments, the base station can use a four-bit bitmap, with each bit corresponding to a port set, to indicate if a port set is a candidate port set. For example, a bitmap of 0011 indicates that only port sets 2 and 3 can be used for rank-2 transmissions. In this case, after indicating the candidate port sets, only one bit is needed in the downlink control message to indicate which port set to be used for rank-2 transmissions if the number of port sets for rank 2 is configured to 1 (e.g., via higher layer signaling).

In some embodiments, the base station can inform the UE that the number of port sets is greater than 1 via higher layer signaling. In such cases, the base station and the UE can agree that different port sets are used for individual layers. For example, a bitmap of 0011 indicates that port sets 2 and 3 can be used for rank-2 transmissions. Because the number of port sets is 2, the base station and the UE can determine, based on the predefined rule, that port set 2 is for layer 1 and port set 3 is for layer 2. No additional signaling is required in the downlink control messages.

In some embodiments, the base station can use a six-bit bitmap, with each bit corresponding to a port set pair (t1, t2)=(0,1), (0,2), (0,3), (1,2), (1,3), or (2,3), to indicate which pair is a valid candidate. For example, a bitmap of 110000 indicates that only port set pairs (0, 1) and (0, 2) can be used. In this case, after indicating the candidate port set pairs, only one bit is needed in the downlink control message to indicate which port set pair to be used for rank-2 transmissions.

In some embodiments, the base station can use a ten-bit bitmap to indicate which port set and/or port set pair can be used for rank-2 transmissions. The first four bits correspond to port set 0, 1, 2, and 3. The last six bits correspond to port set pairs (t1, t2)=(0,1), (0,2), (0,3), (1,2), (1,3), (2,3). For example, a bitmap of 1000000001 indicates that only port set 0 and port set pair (2, 3) can be used for rank-2 transmissions. In this case, after indicating the candidate port set and/or port set pairs, only one bit is needed in the downlink control message to indicate which port set or port set pair to be used for rank-2 transmissions.

In some embodiments, the base station can define an association between the co-phasing values of two port sets. For example, the co-phasing value for layer 2 can be obtained by multiplying the co-phasing value for layer 1 and a value (e.g., 1, −1, j, or −j). The value can be known a priori to the base station or can be configured via higher layer signaling. As shown in Table 7, $t_1$ and $t_2$ correspond $i_1$ for each rank, and can be indicated using higher-layer signaling without any DCI signaling overhead as described above. Parameter n correspond to $i_2$. Only two bits are needed in the downlink control message for indicating the co-phasing value for 2 layers. For example, index values 0, 1, 2, 3 can represent co-phasing values (n, m)=(1, −j), (−1, j), (j, 1), (−j, −1) respectively. Values m and n are for layer 1 and 2 respectively, and n=−j×m (e.g., as shown in Table 7). In some embodiments, alternative rules can be used. For example, when n=1 or −1, m=a×n. Value a is one of 1, −1, j, or −j. When n=j or −j, m=b×n. Value b is one of 1, −1, j, or −j. Index values 0, 1, 2, 3 can represent co-phasing values (n, m)=(1, −j), (−1, j), (j, −1), and (−j, 1). Here, value a can be −j, and value b can be j. The values of a and/or b can be known a priori to the base station and the UE, or can be configured via higher-layer signaling.

TABLE 7

Alternative Uplink Rank-2 Codebook for Eight Antenna Ports

| $i_1$ | $i_2$ | |
|---|---|---|
| | 0-3 | $W_{i_1,i_2}$ |

$$W_{t_1,t_2,n} = \frac{1}{\sqrt{M}} \begin{bmatrix} p_{t_1} & p_{t_2} \\ \varphi_n p_{t_1} & -j \cdot \varphi_n p_{t_2} \end{bmatrix}$$

Example Embodiment 4

This embodiment describes how the base station can indicate the port set(s) to be used for rank-3 transmissions in the case of two-antenna partial coherent transmissions. Because one port set supports up to two layers, two or three port sets are needed for rank-3 transmissions.

Case 1: Two Port Sets

Similar to Case 2 in Example Embodiment 3, $i_1$ can indicate two of four port sets. Meanwhile, $i_1$ can also be used to indicate which one of indicated two port sets transmits two of three layers. For example, $i_1$ can be in the range of [0, 11] to indicate port set pairs (t1, t2)=(0,1), (0,2), (0,3), (1,2), (1,3), (2,3) and (1,0), (2,0), (3,0), (2,1), (3,1), (3,2). The first port set in the port set pair is used for two-layer transmissions, while the second port set in the port set pair is used for one-layer transmission. For example, port set pair (1,3) means that port set 1 is used for two layers and port set 3 is used for one layer. Port set pair (3,1) means port set 3 is used for 2 layers and port set 1 is used for one layer.

To reduce signaling overhead, the base station can define one or more predetermined rules to limit the number of port set selections. For example, the base station and the UE can agree that only two consecutive port sets (e.g., port set 0 and 1, 1 and 2, 2 and 3, 3 and 1) can be used. The base station can also signal to the UE a subset of the port sets as candidate port sets via higher layer signaling (e.g., RRC or MAC CE).

In some embodiments, the base station can use a four-bit bitmap, with each bit corresponding to a port set, to indicate if a port set is a candidate port set. For example, a bitmap of 1011 indicates that port sets 0, 2 and 3 can be used for rank-3 transmissions. In this case, after indicating the candidate port sets, only $\log_2 (C_3^2)=2$ bits are needed in the downlink control message to indicate which port set to be used for rank-3 transmissions.

In some embodiments, the downlink control message can indicate that the number of port sets is greater than 2. In such cases, the base station and the UE can agree that different port sets are used for individual layers. For example, a bitmap of 0111 indicates that port sets 1, 2, and 3 can be used for rank-3 transmissions. Because the number of port sets is 3, the base station and the UE can determine that, based on the predefined rule, port set 1 is for layer 1, port set 2 is for layer 2, and port set 3 is for layer 3. No additional signaling is required in the downlink control messages.

In some embodiments, the base station can use a bitmap of 6 or 12 bits, with each bit corresponding to one or two port set pairs. For example, a bitmap of 110000 indicates that port set pairs (0, 1), (0, 2), (1, 0), and (2, 0) can be used. The number of bits needed in the downlink control message depends on the candidate port set pairs indicated in the higher layer signaling.

In some embodiments, the base station can define an association between the co-phasing values of two port sets.

For example, the co-phasing value for layer 3 can be obtained by multiplying a value (e.g., 1, −1, j, or −j) and the co-phasing value for layer 1 or layer 2, wherein layer 1 and layer 2 use the same port set. Alternatively, the co-phasing value for layer 1 or layer 2 can be obtained by multiplying a value (e.g., 1, −1, j, or −j) and the co-phasing value for layer 3. Layer 1 and layer 2 can use the same port set. As shown in Table 8, $t_1$ and $t_2$ correspond $i_1$ for each rank, and can be indicated using higher-layer signaling without any signaling overhead in the downlink control messages as described above. Value of $i_2$ is in the range of [0, 3]. In some implementations, its value can be 0 or 1 to further reducing signaling overhead (i.e., saving 1 bit for $i_2$ indication). For example, the index 0, 1, 2, 3 can represent co-phasing (n, m)=(1, −j), (−1, j), (j, 1), (−j, −1) respectively. Values m and n are for layer 3 and 1 (or, layer 3 and layer 2) respectively. Value n is defined as n=−j×m (e.g., as shown in Table 8). In some embodiments, alternative rules can be used. For example, when n=1 or −1, m=a×n. Value a is one of 1, −1, j, or −j. When n=j or −j, m=b×n. Value b is one of 1, −1, j or −j. Index values 0, 1, 2, 3 can represent co-phasing values (n, m)=(1, −j), (−1, j), (j, −1), and (−j, 1). Here, value a can be −j and value b can be j. The values of a and b can be known a priori to the base station and/or the UE, or can be configured via higher layer signaling. For layer 1 and/or layer 2 transmissions, the co-phasing value of layer 2 can be obtained by multiplying −1 with the co-phasing of layer 1. It is noted that layer 1 or 2 or 3 can be arranged in any suitable orders. For example, layer 1 can be arranged as the second layer. Similarly, layer 3 can be arranged as the first layer.

TABLE 8

Representative Uplink Rank-3 Codebook for Eight Antenna Ports

| $i_1$ | $i_2$ | |
|---|---|---|
| | 0-3 or 0, 1 | $W_{i_1,i_2}$ |

$$W_{t_1,t_2,n} = \frac{1}{\sqrt{2M}} \begin{bmatrix} p_{t_1} & p_{t_1} & \sqrt{2}\,p_{t_2} \\ \varphi_n p_{t_1} & -\varphi_n p_{t_1} & -\sqrt{2}\,j\cdot\varphi_n p_{t_2} \end{bmatrix}$$

or $$W_{t_1,t_2,n} = \frac{1}{\sqrt{2M}} \begin{bmatrix} p_{t_1} & \sqrt{2}\,p_{t_2} & \varphi_n p_{t_1} \\ \varphi_n p_{t_1} & -\sqrt{2}\,j\cdot\varphi_n p_{t_2} & -\varphi_n p_{t_1} \end{bmatrix}$$

In some embodiments, it can be predefined that, when the co-phasing value of layer 3 is j or −j, the co-phasing value of layer 1 and 2 are [1−1]. Similarly, when the co-phasing of layer 3 is 1 or −1, the co-phasing value of layer 1 and 2 are [j −j].

Case 2: Three Port Sets

There are $C_4^3=4$ possibilities in total for selecting three port sets from a total of four port sets. Thus, in the case of three port sets for rank-3 transmissions, the three port sets can be indicated by $i_1$=0,1,2,3, each representing a port set selection ($t_1$, $t_2$, $t_3$)=(0,1,2), (0,1,3), (0,2,3), or (1,2,3). To reduce signaling overhead, in some embodiments, a 4-bit bitmap can be used to signal, via higher layer signaling, which port sets can be used for rank-3 transmissions. For example, a bitmap of 1100 indicates that port sets (0, 1, 2) and (0, 1, 3) can be used. In this case, after indicating the candidate port sets, only one bit is needed in the downlink control message to indicate which port sets to be used for rank-3 transmissions.

In some embodiments, the base station can define an association between the co-phasing values of three port sets. In some implementations, the base station can define a reference co-phasing set, and require the co-phasing values of the three layers to be in an ascending or descending order. For example, the base station defines a reference co-phasing set as [1, −1, j, −j]. Each index value within the range of [0, 3] represents an element in the reference co-phasing set: index 0 represents 1, index 1 represents −1, index 2 represents j, and index 3 represents −j. A co-phasing set for three layers ($r_1$, $r_2$, $r_3$) thus can be represented using the index values such as [0, 1, 2], [1, 2, 3], [2, 3, 0], and [3, 0, 1], which correspond to φ=[1, −1, j], [−1, j, −j], [j, −j, 1], [−j, 1, −1] respectively. $\varphi_{r_i}$ is the $i_{th}$ value in φ. Furthermore, it can be defined that the r1, r2, and r3 must be consecutive values. In some implementations, the first value (e.g., 0) is considered consecutive to the last value (e.g., 3). Therefore, [0, 1, 2], [1, 2, 3], [2, 3, 0], and [3, 0, 1] can be all considered as consecutive sets. It is noted that the base station can have alternative reference co-phasing sets, such as [1, j, −1, −j], or [1, −j, −1, j]. Table 9 shows another representative uplink rank-3 codebook for rank-3 transmissions.

TABLE 9

Alternative Uplink Rank-3 Codebook for Eight Antenna Ports

| $i_1$ | $i_2$ | |
|---|---|---|
| | 0-3 | $W_{i_1,i_2}$ |

$$W_{t_1,t_2,t_3,r_1,r_2,r_3} = \frac{1}{\sqrt{M}} \begin{bmatrix} p_{t_1} & p_{t_2} & p_{t_3} \\ \varphi_{r_1} p_{t_1} & \varphi_{r_2} p_{t_2} & \varphi_{r_3} p_{t_3} \end{bmatrix}$$

In some embodiments, the co-phasing values for three layers can be the same. In some embodiments, the base station can signal candidate co-phasing values to the UE via higher layer signaling. For example, the base station configures four candidates via RRC signaling: [1, −1, j], [−1, j, −j], [j, −j, 1], and [−j, 1, −1]. After indicating the candidate co-phasing sets, only two bits are needed in the downlink control message to indicate which co-phasing set is used.

Case 3: Two or Three Port Sets

In such cases, $i_1$ is used to indicate either two or three port sets. The base station can define certain rules to reduce signaling overhead in the downlink control messages.

For example, in the cases of periodic scheduling, the base station can indicate, via higher layer signaling, whether two port sets or three port sets are to be used for subsequent rank-3 transmissions. In some implementations, the base station can require different port sets to be used for each layer. For example, if less than three port sets are configured, rank-3 transmission is not supported.

Example Embodiment 5

This embodiment describes how the base station can indicate the port set to be used for rank-4 transmissions in the case of two-antenna partial coherent transmissions.

Rank-4 transmission can be performed using two, three, or four port sets. Value $i_1$ can be used to indicate:

1. two, three, four port sets can be used to transmit all four layers,
2. two or four port sets can be used to transmit all 4 layers, or
3. four port sets are used to transmit all 4 layers, and $i_1$ can be zero bit.

In some embodiments, the base station can define an association between the co-phasing values of four port sets. In some implementations, the base station can define a reference co-phasing set, and require the co-phasing values of the three layers to be in an ascending or descending order. For example, the base station defines a reference co-phasing set as [1, −1, j, −j]. Each index value within the range of [0, 3] represents an element in the reference co-phasing set: index 0 represents 1, index 1 represents −1, index 2 represents j, and index 3 represents −j. A co-phasing set for four layers ($r_1, r_2, n, r_4$) thus can be represented using the index values such as [0, 1, 2, 3], [1, 2, 3, 0], [2, 3, 0, 1], and [3, 0, 1, 2], which correspond to (p=[1, −1, j, −j], [−1, j, −j, 1], [j, −j, 1, −1], [−j, 1, −1, j] respectively. $\varphi_{r_1}$ is the $i_{th}$ value in $\varphi$. Furthermore, it can be defined that the r1, r2, and r3 must be consecutive values. In some implementations, the first value (e.g., 0) is considered consecutive to the last value (e.g., 3). Therefore, [0, 1, 2], [1, 2, 3], [2, 3, 0], and [3, 0, 1] can be all considered as consecutive sets. It is noted that the base station can have alternative reference co-phasing sets, such as [1, j, −1, −j], or [1, −j, −1, j]. Table 10 shows a representative uplink rank-4 codebook for rank-4 transmissions.

TABLE 10

Representative Uplink Rank-4 Codebook for Eight Antenna Ports

| $i_1$ | $i_2$ |
|---|---|
| 0-3 | $W_{i_1, i_2}$ |

$$W_{t_1,t_2,t_3,t_3,r_1,r_2,r_3,r_4} = \frac{1}{\sqrt{M}} \begin{bmatrix} p_{t_1} & p_{t_2} & p_{t_3} & p_{t_4} \\ \varphi_{r_1} p_{t_1} & \varphi_{r_2} p_{t_2} & \varphi_{r_3} p_{t_3} & \varphi_{r_4} p_{t_4} \end{bmatrix}$$

In some embodiments, the co-phasing values for four layers can be the same. In some embodiments, the base station can signal candidate co-phasing values to the UE via higher layer signaling. For example, the base station configures four candidates via RRC signaling: [1, −1, j, −j], [−1, j, −j, 1], [j, −j, 1, −1], and [−j, 1, −1, j]. After indicating the candidate co-phasing sets, only two bits are needed in the downlink control message to indicate which co-phasing set is used.

For transmission in higher ranks, similar rules and/or higher layer signaling can be used. For example, rank-5 transmissions can be performed using three, four, or five port sets. Value $i_1$ can be used to indicate:
1. three or four port sets can be used to transmit all 5 layers, or
2. four port sets must be used to transmit all 5 layers. Value $i_1$ is further used to indicate one port set is used to transmit 2 layers.

Similar rules can also be used for higher ranks, such as rank 6, 7, or 8.

Category 2: Four-Antenna Partial Coherent Transmissions

In four-antenna partial coherent transmissions, eight antenna ports are grouped into two coherent port sets. Port set 0 includes ports {0,1,4,5} and port set 1 includes ports {2,3,6,7}. Because there are two ports in the same polarization in the same port set (e.g., port 0 and 4 have the same polarization), a Discrete Fourier Transform (DFT) vector can be used on the two ports with the same polarization to perform beamforming. Different DFT vectors can be used to form different beams.

Therefore, value $i_1$ can be split into two parts: $i_{11}$ and $i_{12}$, with $i_{11}$ indicating beam selections and $i_{12}$ indicating port selection. Typically, both $i_{11}$ and $i_{12}$ are wideband information indicators.

$$v_l = \begin{bmatrix} 1 & e^{j\frac{2\pi l}{ON}} & 1 & e^{j\frac{2\pi l}{ON}} \end{bmatrix}^T$$

$$p_0 = [1 \ 1 \ 0 \ 0]^T, p_1 = [0 \ 0 \ 1 \ 1]^T;$$

$$q_{l,t}(i) = v_l(i)p_t(i) = \begin{bmatrix} 1 \cdot p_t(0) & e^{j\frac{2\pi l}{ON}} \cdot p_t(1) & 1 \cdot p_t(2) & e^{j\frac{2\pi l}{ON}} \cdot p_t(3) \end{bmatrix}^T$$

$$\varphi_n = e^{j\pi n/2}$$

Here, value l of vector v corresponds to $i_{11}$, which is used for indicating beam selection. Value t of vector p corresponds to $i_{12}$, which is used for indicating port set selection. N represents the number of antenna ports with the same polarization and N=2. O represents the oversampling factor.

Similar to the embodiments in Category 1, a set of rules can be predefined to reduce signaling overhead. In some embodiments, candidate port set(s) can be configured via higher layer signaling (e.g., using a bitmap). For example, for rank-1 transmissions, a 2-bit bitmap can be used to indicate which port set(s) can be used for the transmissions. A bitmap of 01 indicates that only port set 1 is a valid candidate. For rank-2 transmission, a bitmap of 11 indicates that both port sets can be used for uplink transmissions.

In some embodiments, when 2≤R≤3, two port sets must be used for transmissions. In some implementations, one or two port sets can be used.

Example Embodiment 6

This embodiment describes how the base station can indicate the port set to be used for rank-1 transmissions in the case of four-antenna partial coherent transmissions.

Table 11 shows the representative precoder W for rank-1 transmissions. Assuming O=2, two bits are needed for $i_{11}$ and one bit is needed for $i_{12}$ in the downlink control messages.

TABLE 11

Representative Rank-1 Transmitted Pre-coding Matrix Indicator Rank 1

| $i_{11}$ | $i_{12}$ | $i_2$ | |
|---|---|---|---|
| 0, ... NO − 1 | 0, 1 | 0, 1, 2, 3 | $W_{i_{11}, i_{12}, i_2}$ | where $W_{l,t,n} = \frac{1}{\sqrt{M}} \begin{bmatrix} q_{l,t} \\ \varphi_n q_{l,t} \end{bmatrix}$ $$W_{l,0,n} = \begin{bmatrix} 1 & e^{j\frac{2\pi l}{ON}} & 0 & 0 & \varphi_n & \varphi_n \cdot e^{j\frac{2\pi l}{ON}} & 0 & 0 \end{bmatrix}^T$$

E.g.

$$W_{l,1,n} = \begin{bmatrix} 0 & 0 & 1 & e^{j\frac{2\pi l}{ON}} & 0 & 0 & \varphi_n & \varphi_n \cdot e^{j\frac{2\pi l}{ON}} \end{bmatrix}^T$$

Example Embodiment 7

This embodiment describes how the base station can indicate the port set to be used for rank-2 transmissions in the case of four-antenna partial coherent transmissions. In such cases, beam selection and co-phasing values can be independent for the two port sets.

For example, $i_{11}$ indicates beam selection for layer 1 and layer 2. Assuming O=2, two bits are needed for beam selection for layer 1, and two bits are also needed for beam selection for layer 2. The value for $i_{12}$ is zero because both two port sets are used. Four bits are needed in total for $i_1$.

Value $i_2$ is the co-phasing value for layer 0 and layer 1. Two bits are needed for layer 1, and two bits are needed for layer 2. Four bits are needed in total for $i_2$.

Thus, to signal two port sets, eight bits are needed (for both $i_1$ and $i_2$). The signaling overhead is not desirable. To reduce such signaling overhead, associations for the beam selections between two port sets can be known a priori to the base station and/or the UE or can be configured via higher-layer signaling In some embodiments, the base station can require that port set 0 (for layer 1) and port set 1 (for layer 2) have the same beam selection. For example, assuming O=2, two bits are needed for in to indicate the beam pair (0, 0), (1, 1), (2, 2), or (3, 3).

In some embodiments, the base station can require the port set 0 (for layer 1) and port set 1 (for layer 2) have adjacent beams. For example, assuming O=2, two bits are needed for in to indicate the beam pair (l, k)=(0, 1), (1, 2), (2, 3), or (3, 0).

In some embodiments, the base station can require that port set 0 (for layer 1) and port set 1 (for layer 2) have orthogonal beams. For example, for a beam pair (l, k), k=l+O.

The selected associations can be signaled to the UE via higher layer signaling (RRC and/or MAC CE). For example, a 2-bit bitmap can be used to indicate which association is used: same beam selection, consecutive beam selection, or orthogonal beam selection. In some implementations, the UE can transmit a response back as a feedback to acknowledge the beam association.

To reduce signaling overhead, the base station can also define some associations for the co-phasing values between two port sets.

In some embodiments, the co-phasing value of layer 2 can be the multiplication of a value (e.g., j or −j) and the co-phasing value of layer 1. The value (i.e., j or −j) can be indicated by $i_2$.

Figures 3A, 3B:
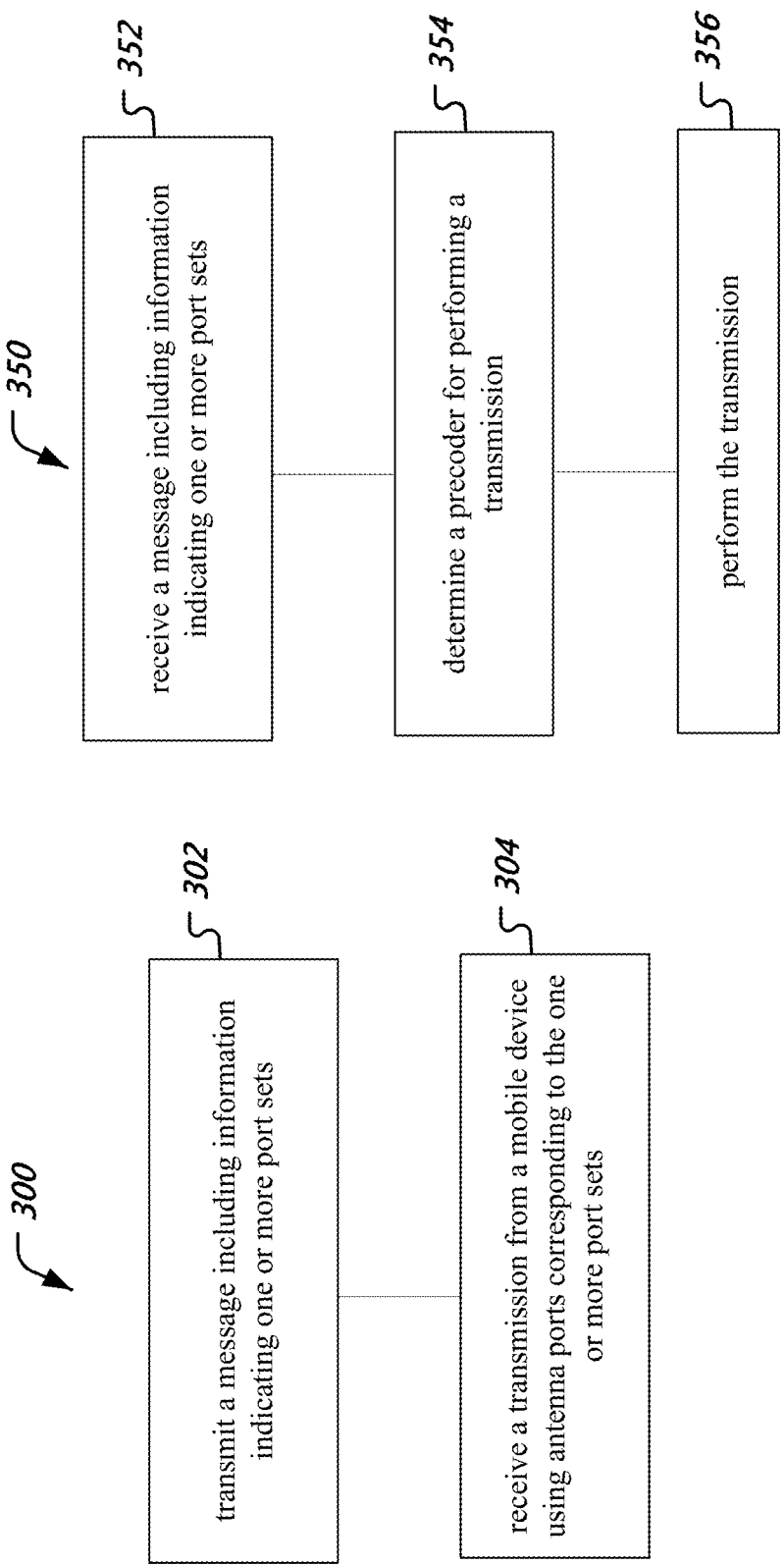
FIG. 3A is a flowchart representation of a method for wireless communication.
FIG. 3B is a flowchart representation of another method for wireless communication.

FIG. 3A is a flowchart representation of a method 300 for wireless communication. The method 300 includes, at 302, transmitting, from the wireless communication node to a mobile device that comprises eight antenna ports, a first message including a wideband information indicating one or more port sets for a transmission to be performed from the mobile device to the wireless communication node. An individual port set includes one of: (a) two antenna ports, or (b) four antenna ports. The wideband information allows the mobile device to identify a precoder for performing the transmission. The method 300 also includes, at 304, receiving, at the wireless communication node, the transmission from the mobile device using antenna ports corresponding to the one or more port sets indicated by the message.

In some embodiments, the eight antenna ports are indicated by values {0, 1, 2, 3, 4, 5, 6, 7}, and the one or more port sets include at least one of the following {0, 4}, {1, 5}, {2, 6}, or {3, 7}. In some embodiments, the eight antenna ports are indicated by values {0, 1, 2, 3, 4, 5, 6, 7}, and wherein the one or more port sets include at least one of the following {0, 1, 4, 5}, or {2, 3, 6, 7}.

In some embodiments, the method includes transmitting, from the wireless communication node, a second message to the mobile device prior to transmitting the first message. The second message identifies a set of candidate port sets. The one or more port sets identified by the first message are selected from the set of candidate port sets.

In some embodiments, the second message comprises one or more bitmaps for identifying the set of candidate port sets. In some embodiments, candidate port sets corresponding to a transmission rank R+1 includes all candidate port sets corresponding to a transmission rank R, R being greater than or equal to 1. In some embodiments, candidate port sets corresponding to a transmission rank R include at least R port sets.

In some embodiments, the transmission corresponds to a transmission rank R and a number of port sets to be used for the transmission is equal to R, R being equal to one of 2, 3, or 4. The number of port sets to be used for the transmission having the transmission rank R can be configured by a higher-layer signaling message. In some embodiments, the number of port sets to be used for the transmission having the transmission rank R is reported by the mobile device. In some embodiments, a beam association between two port sets among the set of candidate port sets is identified by the second message or known a priori to the wireless communication node.

In some embodiments, the first message further includes a wideband or sub-band information indicating one or more co-phasing values, each co-phasing value indicating a phase difference between antenna ports in a port set that have different polarizations. In some embodiments, a co-phasing value corresponding to a first port set is obtained by multiplying a co-phasing value corresponding to a second port set and a predetermined value. The first port set and the second port set can be identified by the first message or known a priori to the communication node. The predetermined value can include one of 1, −1, j, or −j.

In some embodiments, the one or more co-phasing values are determined using a reference co-phasing set. The reference co-phasing set can include [1, −1, j, −1], [1, j, 01, −j], or [1, −j, −1, j].

In some embodiments, the second message includes a second wideband or sub-band information identifying a set of candidate co-phasing values, and wherein the one or more co-phasing values are selected from the set of candidate co-phasing values.

FIG. 3B is a flowchart representation of a method 350 for wireless communication. The method 350 includes, at 352, receiving, at a mobile device that comprises eight antenna ports, a first message from a wireless communication node. The first message includes a wideband information indicating one or more port sets for a transmission to be performed from the mobile device to the wireless communication node. An individual port set includes one of: (a) two antenna ports, or (b) four antenna ports. The method 350 further includes, at 352, determining, based on the one or more port sets indicated by the first message, a precoder for performing the transmission. The method 350 also includes, at 354, performing, by the mobile device, the transmission to the wireless communication node using antenna ports corresponding to the one or more port sets indicated by the first message.

In some embodiments, the eight antenna ports are indicated by values {0, 1, 2, 3, 4, 5, 6, 7}, and the one or more port sets include at least one of the following {0, 4}, {1, 5}, {2, 6}, or {3, 7}. In some embodiments, the eight antenna ports are indicated by values {0, 1, 2, 3, 4, 5, 6, 7}, and wherein the one or more port sets include at least one of the following {0, 1, 4, 5}, or {2, 3, 6, 7}.

In some embodiments, the method includes receiving, at the mobile device, a second message from the wireless communication node prior to receiving the first message. The second message identifies a set of candidate port sets. The one or more port sets identified by the first message are selected from the set of candidate port sets.

In some embodiments, the second message comprises one or more bitmaps for identifying the set of candidate port sets. In some embodiments, candidate port sets corresponding to a transmission rank R+1 includes all candidate port sets corresponding to a transmission rank R, R being greater than or equal to 1. In some embodiments, candidate port sets corresponding to a transmission rank R include at least R port sets.

In some embodiments, the transmission corresponds to a transmission rank R and a number of port sets to be used for the transmission is equal to R, R being equal to one of 2, 3, or 4. The number of port sets to be used for the transmission having the transmission rank R can be configured by a higher-layer signaling message. In some implementations, the number of port sets to be used for the transmission having the transmission rank R can be reported by the mobile device. In some embodiments, a beam association between two port sets among the set of candidate port sets is identified by the second message or known a priori to the mobile device In some embodiments, the first message further includes a wideband or sub-band information indicating one or more co-phasing values, each co-phasing value indicating a phase difference between antenna ports in a port set that have different polarizations. In some embodiments, a co-phasing value corresponding to a first port set is obtained by multiplying a co-phasing value corresponding to a second port set and a predetermined value. The first port set and the second port set can be identified by the first message or known a priori to the communication node. The predetermined value can include one of 1, −1, j, or −j.

In some embodiments, the one or more co-phasing values are determined using a reference co-phasing set. The reference co-phasing set can include [1, −1, j, −1], [1, j, 01, −j], or [1, −j, −1, j].

In some embodiments, the second message includes a second wideband or sub-band information identifying a set of candidate co-phasing values, and wherein the one or more co-phasing values are selected from the set of candidate co-phasing values.

Figure 4:
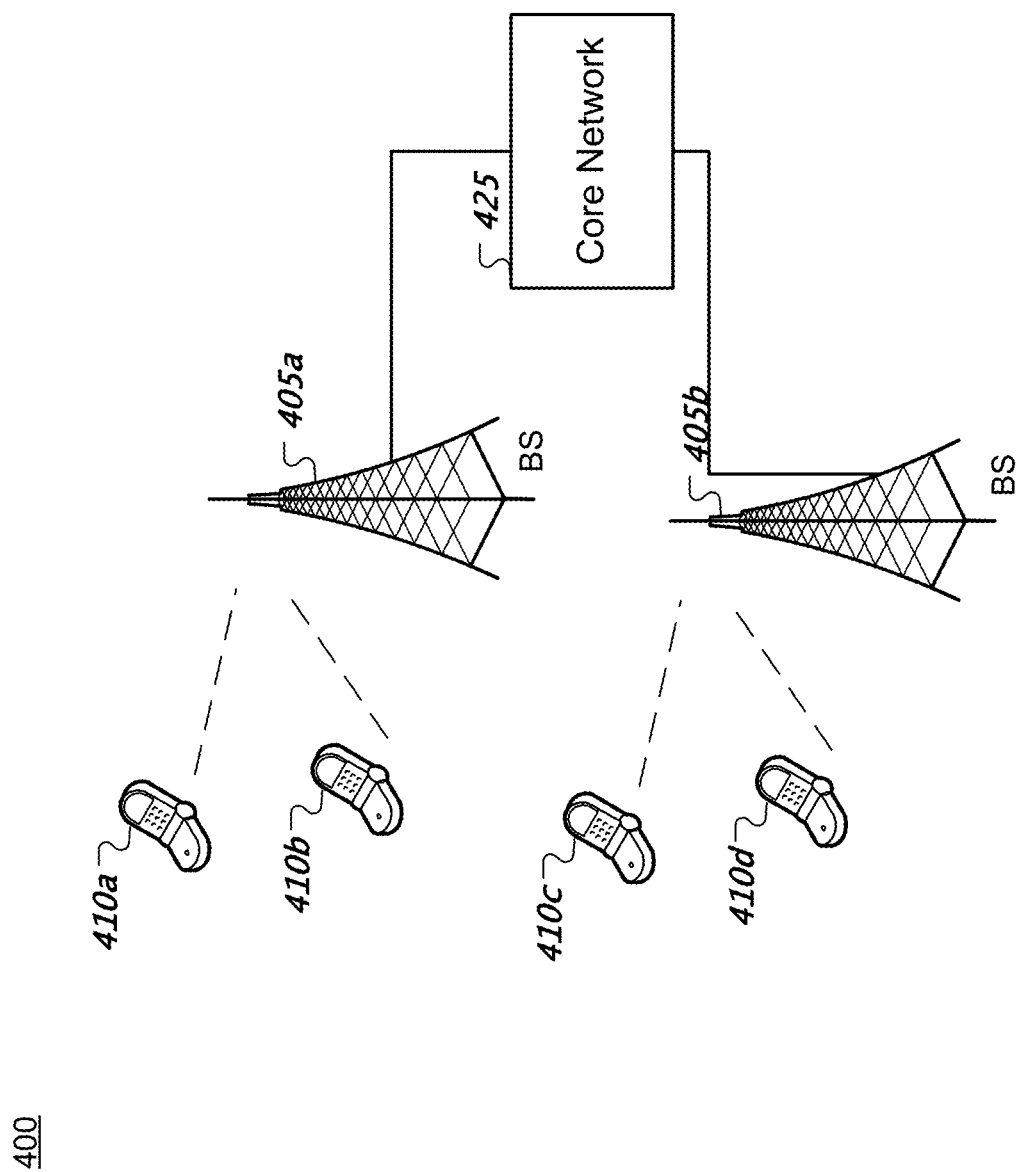
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
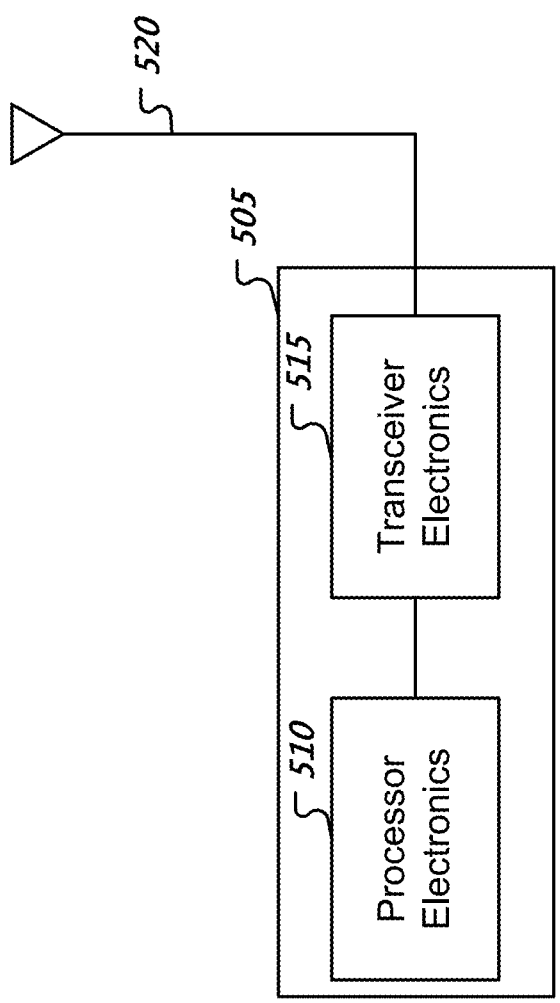
FIG. 5 is a block diagram representation of a portion of a radio station.

FIG. 5 is a block diagram representation of a portion of a radio station. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

It is thus evident that methods and corresponding apparatus relating to performing partial coherent transmissions by a mobile device that supports a large number of antennas are disclosed. In particular, various techniques have been described to allow a reduction of signaling overhead for indicating the selected antenna port set(s) for the partial coherent transmissions.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
   transmitting, from a mobile device that comprises at least eight antenna ports, a message to a wireless communication node, the message including at least one of:
   (1) a first field indicating a first capability of the mobile device for performing a one-layer transmission using two antenna ports corresponding to a first port set selected from two or more port sets, or
   (2) a second field indicating a second capability of the mobile device for performing a one-layer transmission using four antenna ports corresponding to a second port set selected from the two or more port sets,
   wherein an individual port set of the two or more port sets includes one of (a) two antenna ports, or (b) four antenna ports.

2. The method of claim 1, wherein the at least eight antenna ports are indicated by values $\{0, 1, 2, 3, 4, 5, 6, 7\}$, and wherein the two or more port sets include at least one of the following: $\{0, 4\}$, $\{1, 5\}$, $\{2, 6\}$, or $\{3, 7\}$.

3. The method of claim 1, wherein the at least eight antenna ports are indicated by values $\{0, 1, 2, 3, 4, 5, 6, 7\}$, and wherein the two or more port sets include at least one of the following $\{0, 1, 4, 5\}$, or $\{2, 3, 6, 7\}$.

4. A method for wireless communication, comprising:
   receiving, by a wireless communication node, a first message from a mobile device that comprises at least eight antenna ports, the first message including at least one of:
   (1) a first field indicating a first capability of the mobile device for performing a one-layer transmission using two antenna ports corresponding to a first port set selected from two or more port sets, or
   (2) a second field indicating a second capability of the mobile device for performing a one-layer transmission using four antenna ports corresponding to a second port set selected from the two or more port sets,
   wherein an individual port set of the two or more port sets includes one of (a) two antenna ports, or (b) four antenna ports
   transmitting, from the wireless communication node to the mobile device that comprises eight antenna ports based on the first message, a second message including a wideband information indicating at least one port set of the two or more port sets for a transmission to be performed from the mobile device to the wireless communication node, wherein the wideband information allows the mobile device to identify a precoder for performing the transmission; and
   receiving, at the wireless communication node, the transmission from the mobile device using antenna ports corresponding to the at least one port set indicated by the second message.

5. The method of claim 4, wherein the eight antenna ports are indicated by values {0, 1, 2, 3, 4, 5, 6, 7}, and the two or more port sets include at least one of the following {0, 4}, {1, 5}, {2, 6}, or {3, 7}.

6. The method of claim 4, wherein the eight antenna ports are indicated by values {0, 1, 2, 3, 4, 5, 6, 7}, and wherein the two or more port sets include at least one of the following {0, 1, 4, 5}, or {2, 3, 6, 7}.

7. The method of claim 4, comprising:
transmitting, from the wireless communication node, a second message to the mobile device prior to transmitting the first message, the second message identifying a set of candidate port sets, wherein one or more port sets identified by the first message are selected from the set of candidate port sets.

8. The method of claim 7, wherein candidate port sets corresponding to a transmission rank R+1 includes all candidate port sets corresponding to a transmission rank R, R being greater than or equal to 1.

9. The method of claim 7, wherein a beam association between two port sets among the set of candidate port sets is identified by the second message or known a priori to the communication node.

10. The method of claim 7, wherein the second message further includes a wideband or sub-band information indicating one or more co-phasing values, each co-phasing value indicating a phase difference between antenna ports in a port set that have different polarizations, wherein the one or more co-phasing values are determined using a reference co-phasing set that includes [1, −1, j, −1], [1, j, 01, −j], or [1, −j, −1, j].

11. An apparatus for wireless communication comprising at least eight antenna ports, the apparatus further comprising:
a processor that is configured to:
transmit a message to a wireless communication node, the message including at least one of:
(1) a first field indicating a first capability of the apparatus for performing a one-layer transmission using two antenna ports corresponding to a first port set selected from two or more port sets, or
(2) a second field indicating a second capability of the apparatus for performing a one-layer transmission using four antenna ports corresponding to a second port set selected from the two or more port sets,
wherein an individual port set of the two or more port sets includes one of (a) two antenna ports, or (b) four antenna ports.

12. The apparatus of claim 11, wherein the at least eight antenna ports are indicated by values {0, 1, 2, 3, 4, 5, 6, 7}, and wherein the two or more port sets include at least one of the following: {0, 4}, {1, 5}, {2, 6}, or {3, 7}.

13. The apparatus of claim 11, wherein the at least eight antenna ports are indicated by values {0, 1, 2, 3, 4, 5, 6, 7}, and wherein the two or more port sets include at least one of the following {0, 1, 4, 5}, or {2, 3, 6, 7}.

14. A wireless communications apparatus comprising a processor that is configured to:

receive a first message from a mobile device that comprises at least eight antenna ports, the first message including at least one of:
(1) a first field indicating a first capability of the mobile device for performing a one-layer transmission using two antenna ports corresponding to a first port set selected from two or more port sets, or
(2) a second field indicating a second capability of the mobile device for performing a one-layer transmission using four antenna ports corresponding to a second port set selected from the two or more port sets,
wherein an individual port set of the two or more port sets includes one of (a) two antenna ports, or (b) four antenna ports
transmit, to the mobile device that comprises eight antenna ports based on the first message, a second message including a wideband information indicating at least one port set of the two or more port sets for a transmission to be performed by the mobile device, wherein the wideband information allows the mobile device to identify a precoder for performing the transmission; and
receive the transmission from the mobile device using antenna ports corresponding to the at least one port set indicated by the second message.

15. The apparatus of claim 14, wherein the eight antenna ports are indicated by values {0, 1, 2, 3, 4, 5, 6, 7}, and the two or more port sets include at least one of the following {0, 4}, {1, 5}, {2, 6}, or {3, 7}.

16. The apparatus of claim 14, wherein the eight antenna ports are indicated by values {0, 1, 2, 3, 4, 5, 6, 7}, and wherein the two or more port sets include at least one of the following {0, 1, 4, 5}, or {2, 3, 6, 7}.

17. The apparatus of claim 14, wherein the processor is configured to:
transmit a second message to the mobile device prior to transmitting the first message, the second message identifying a set of candidate port sets, wherein one or more port sets identified by the first message are selected from the set of candidate port sets.

18. The apparatus of claim 17, wherein candidate port sets corresponding to a transmission rank R+1 includes all candidate port sets corresponding to a transmission rank R, R being greater than or equal to 1.

19. The apparatus of claim 17, wherein a beam association between two port sets among the set of candidate port sets is identified by the second message or known a priori to the communication node.

20. The apparatus of claim 17, wherein the second message further includes a wideband or sub-band information indicating one or more co-phasing values, each co-phasing value indicating a phase difference between antenna ports in a port set that have different polarizations, wherein the one or more co-phasing values are determined using a reference co-phasing set that includes [1, −1, j, −1], [1, j, 01, −j], or [1, −j, −1, j].

* * * * *